United States Patent [19]

Burkard et al.

[11] Patent Number: 5,412,834
[45] Date of Patent: May 9, 1995

[54] WINDSHIELD WIPER BLADE WITH COMPOSITE SUPPORTING BRACKET FRAME

[75] Inventors: Hermann Burkard, Iffezheim; Wolfgang Leutsch, Buehlertal; Wilfried Merkel, Kappelrodeck; Martin Schaeck, Buehl, all of Germany

[73] Assignee: Robert Bosch GmbH, Stuttgart, Germany

[21] Appl. No.: 248,444

[22] Filed: May 24, 1994

[30] Foreign Application Priority Data

Jun. 22, 1993 [DE] Germany .................. 43 20 637.9

[51] Int. Cl.$^6$ ............................................. B60S 1/38
[52] U.S. Cl. ................................. 15/250.42; 15/250.31
[58] Field of Search .......... 15/250.42, 250.36, 250.41, 15/250.04, 250.06, 250.09, 245, 250.31

[56] References Cited

U.S. PATENT DOCUMENTS

| | | | |
|---|---|---|---|
| 2,700,785 | 2/1955 | Oishei et al. | 15/250.42 |
| 3,094,734 | 6/1963 | Hoyler | 15/250.42 |
| 4,123,817 | 11/1978 | Hartery | 15/250.36 |
| 4,279,054 | 7/1981 | Hancou | 15/250.42 |
| 4,649,593 | 3/1987 | Gilliam, III et al. | 15/250.36 |
| 4,782,549 | 11/1988 | Beneteau et al. | 15/250.42 |
| 4,796,326 | 1/1989 | Beneteau et al. | 15/250.42 |

FOREIGN PATENT DOCUMENTS

| | | | |
|---|---|---|---|
| 1116090 | 10/1961 | Germany | 15/250.36 |
| 2843164 | 4/1979 | Germany | 15/250.42 |
| 8616349 | 9/1986 | Germany | |

Primary Examiner—David A. Scherbel
Assistant Examiner—Gary K. Graham
Attorney, Agent, or Firm—Michael J. Striker

[57] ABSTRACT

A windshield wiper blade comprises a composite supporting bracket frame pivotally connected with a driven wiper arm and including a plurality of frame components, at least some of the components being provided with holding claws, and elongated wiper strip composed of an elastic material and guided in the holding claws, the wiper strip having a strip back which is engaged by the holding claws and has end portions extending outwardly beyond the claws and a longitudinal opening, the wiper strip having a longitudinal wiper lip adapted to abut against a windshield to be wiped and an elastic reinforcing rail received in the longitudinal opening of the strip back and having a length substantially corresponding to a length of the wiper strip, the longitudinal opening of the strip back being formed as a circularly closed throughgoing passage with a cross-section corresponding to the cross-section of the reinforcing rail, the reinforcing rail having at least one longitudinal side provided with two expansions which are spaced from one another and extending outwardly beyond its cross-section so as to form securing means for securing the wiper strip on the supporting bracket frame and holding the reinforcing rail in the strip back, the expansions being spaced from one another by a distance which is greater than the width of one of the holding claws in a longitudinal direction on the wiper strip, so that in a finally mounted condition the holding claws of the wiper strip engage between the expansions.

5 Claims, 1 Drawing Sheet

WINDSHIELD WIPER BLADE WITH COMPOSITE SUPPORTING BRACKET FRAME

BACKGROUND OF THE INVENTION

The present invention relates generally to windshield wipers, and in particular to a windshield wiper blade.

More particularly, it relates to such a windshield wiper blade which has a composite supporting bracket frame pivotally carrying a driven wiper arm and having a wiper strip guided in holding claws of the frame parts.

Windshield wiper blades of this general type are known in the art. One of such windshield wiper blades is disclosed for example in the German document DE-GM 86 16 349. In this windshield wiper blade and end piece cut out at each end of the wiper strip from the strip back so that the wiper strip during the operation of the wiper cannot disengage from the supporting bracket frame. These end pieces can be however released from the plate backs during the operation or lost even before the mounting so that the wiper strip becomes nonuseable.

SUMMARY OF THE INVENTION

Accordingly, it is an object of the present invention to provide a windshield wiper blade, which avoids the disadvantages of the prior art.

In keeping with these objects and with others which will become apparent hereinafter, one feature of the present invention resides, briefly stated, in a windshield wiper blade, in which the longitudinal opening in the wiper strip backs is formed as a circularly closed throughgoing passage with a cross-section corresponding to the cross-section of the reinforcing rail, the reinforcing rail is provided at at least one longitudinal side with two expansions which are arranged at a distance from one another and extend parallel over the cross-section and form safety means, the distance between the expansions is greater than the width of a holding claw when measured in the longitudinal direction of the wiper strip, and in the finally mounted wiper blade this holding claw of the wiper strip engages between the expansions.

When the windshield wiper blade is designed in accordance with the present invention, then for mounting the wiper strip the holding claw must be just slightly bent so that it can engage between both expansions. After the bending the claws together, the wiper strip is held non-releasably on the supporting bracket frame for a long time. Neither can it be lost during the operation, nor loose end pieces for securing the wiper strip on the supporting bracket frame are necessary.

The additional advantage of the inventive construction is that a direct contact between the reinforcing rail and the holding claws and therefore a resulting noise generation is avoided.

In accordance with another feature of the present invention a pair of expansions is arranged on each longitudinal side of the reinforcing rail.

With respect to the longitudinal axis of the reinforcing rail, the expansions of one pair and the expansions of the other pair are located opposite to one another.

The expansions can be arranged on an end portion of the reinforcing rail. They can be formed by deformation of the reinforcing rail.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
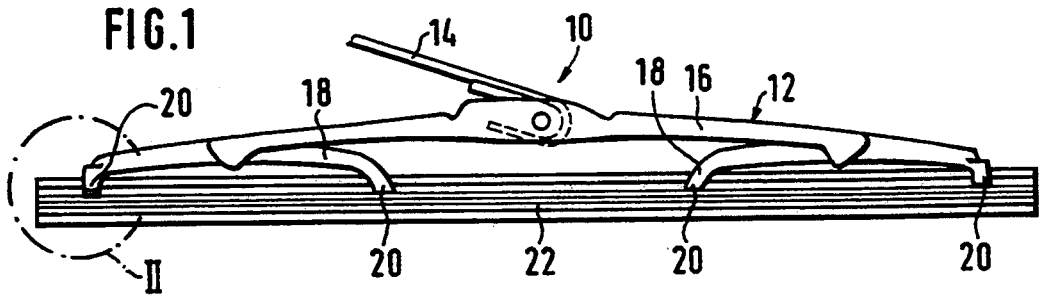
FIG. 1 is a view showing a windshield wiper blade in accordance with the present invention.

A windshield wiper blade is identified in FIG. 1 as a whole with reference numeral 10. It has a composite supporting bracket frame 12 assembled from several frame components. The components include a main bracket 16 connected with a driven wiper arm 14, and claw brackets 18 which are pivotally connected with the ends of the main bracket 16 similarly to a scale balance. Holding claws 20 are arranged on the ends of each claw bracket 18 and hold a wiper strip 22 on the supporting bracket frame 20. The wiper strip 22 is made for example from an elastic material by extrusion. As can be seen from FIG. 3, the elongated wiper strip 22 has a strip back 24 connected with a wiper lip 28 by a so-called rocking web 26. The wiper lip 28 abuts with its free end against a windshield to be wiped. The abutment force is applied by the wiper arm 14 to the wiper blade 10 and transmitted through the supporting bracket frame 16, 18 in a stepped manner to the wiper strip 22.

Figure 2:
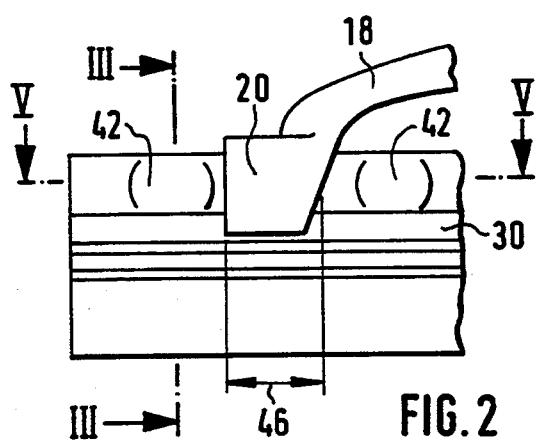
FIG. 2 is a view showing a detail II of the blade of FIG. 1 on an enlarged scale.
Figure 3:
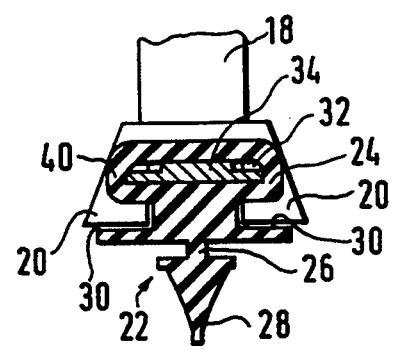
FIG. 3 is a view showing a section of the blade taken along the line III—III in FIG. 2.

As can be seen from FIGS. 2-5, a claw pair 20 is arranged on each end of a claw bracket 18. The individual claws of each claw pair 20 are located opposite to one another with respect to the longitudinal axis of the wiper blade. They engage a part of the wiper strip back 24 and extend into the claw grooves 30 which are formed opposite to one another as open-edge grooves on the wiper strip backs 24. The holding claw pair 20 surrounds this part of the wiper strip backs 24 so that the wiper strip is displaceably guided in the claws. Further, a longitudinal opening 32 is provided in the wiper strip back 24 and formed as a circularly closed throughgoing passage as shown in FIG. 3.

A reinforcing rail 34 is accommodated in the longitudinal opening 32. It is relatively rigid however is still elastic within certain limits, so that it contributes to further orderly distribution of the abutment force of the wiper blade onto the windshield to be wiped. The reinforcing rail 34 extends substantially over the whole length of the windshield wiper blade back 24. The length of the windshield wiper blade back 24 is dimensioned so that its both end portions extend outwardly beyond the outermost claw pair 20. The cross-section of the throughgoing passage 32 corresponds to the cross-section of the reinforcing rail 34, so that the reinforcing rail 34 can be introduced into the throughgoing passage 32.

Figure 5:
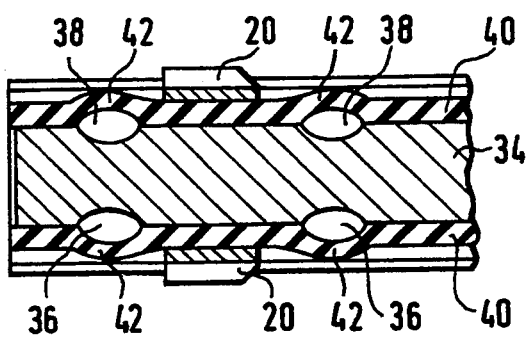
FIG. 5 is a view showing a section of the windshield wiper taken along the line V—V in FIG. 2.

As can be seen from FIG. 5, the reinforcing rail 34 is provided in its one end region with expansions 36 and 38 which are arranged at longitudinal sides of the reinforcing rail 34. The expansions are molded or impressed in the shown embodiment from the reinforcing rail 34 composed of a spring band steel without removing any material. The expansions 36 and 38 are produced by an impression punch which partially reduces the reinforcing rail 34 in its thickness and thereby causes the local expansions. The expansions extend outwardly beyond a cross-section of the reinforcing rail. Each two expansions 36 and 38 are associated with one another. As can be seen in this embodiment, two pairs of the expansions 36, 38 are arranged, while however, for achieving the above described purposes, it is sufficient when only two expansions are provided at the same side of the reinforcing rail. These expansions operate so that during insertion of the reinforcing rail 34 into the throughgoing passage 32 its side walls must be expanded so that the reinforcing rails 34 with their expansions reach their final positions in which it is completely located in the throughgoing passage 32. Since in the region of the expansions 36 and 38 the walls 40 of the throughgoing passage 32 are pressed outwardly so that no knob-like raised portions 42 are produced there, the reinforcing rail 34 is secured in the throughgoing passage 32 and thereby an unintentional displacement of the reinforcing rail 34 outwardly from the throughgoing passage 32 is prevented.

Figure 4:
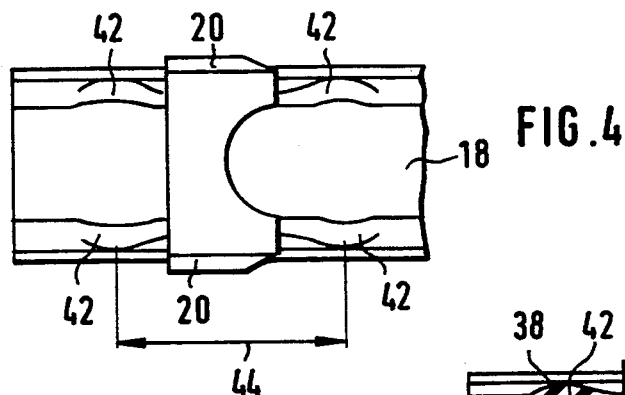
FIG. 4 is a plan view of the windshield wiper blade portion shown in FIG. 2.

As can be seen from FIGS. 2, 4 and 5, the distance 44 between the associated expansions 36 and 38 is substantially greater than the width 40 of the holding claws 20 in the longitudinal direction of the wiper strip 22. Further, as can be seen especially from FIG. 5, the expansions 36 of one pair are located opposite to the expansions 38 of the other pair with respect to the longitudinal axis of the reinforcing rail 34. Finally, as can be recognized from FIGS. 2, 4 and 5, in the finally mounted wiper blade 10 the holding claws 20 of the wiper strip back 24 are located between the expansions 36 or 38 or between the knob-like raised portions 42 of the same and engage the wiper strip backs so that the holding claws 20 can no longer displace over the knob-like raised portions 42. The end claw pair 20 shown in the drawings is caught to a certain extend between the knob-like raised portions 42 so that the wiper strip 22 is non-releasably connected with the supporting bracket frame 12. The expansions 36 or 38 are also responsible for the formation of the knob-like raised portions or bulges 42. They form therefore the securing means which provide fixation of the wiper strip 22 on the supporting frame 12 and the reinforcing rail 34 in the strip back 24.

The wiper strip 22 can be easily released from the supporting bracket frame 12 by insignificant bending of the claw pair 20 and replaced with a new wiper strip 22 provided with the reinforcing rail 34. For securing the wiper strip on the supporting bracket frame 12 the both claws of the claw pair 20 must be compressed so that a reliable securing for the wiper strip 22 on the supporting bracket frame 20 is obtained. The other holding claw pair 20 serves for orderly guidance of the wiper strip, so that during the wiping process it can be easily adjusted to the curvature of the windshield to be wiped.

It will be understood that each of the elements described above, or two or more together, may also find a useful application in other types of constructions differing from the types described above.

While the invention has been illustrated and described as embodied in a windshield wiper blade with composite supporting bracket frame, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A windshield wiper blade, comprising a composite supporting bracket frame pivotally connected with a wiper arm and including a plurality of frame components, at least one of said components being provided with holding claws; and elongated wiper strip composed of an elastic material and guided in said holding claws, said wiper strip having a strip back which is engaged by said holding claws and has end portions extending outwardly beyond said claws, said strip back also having a longitudinal opening, said wiper strip having a longitudinal wiper lip adapted to abut against a windshield to be wiped and an elastic reinforcing rail received in said longitudinal opening of said strip back and having a length substantially corresponding to a length of said wiper strip, said longitudinal opening of said strip back being formed as a throughgoing passage which is open only at each end of said strip back and has a cross-section corresponding to a cross-section of said reinforcing rail, said reinforcing rail having at least one longitudinal side provided with two expansions which are longitudinally spaced from one another and extending laterally outwardly from said side so as to form securing means for securing said wiper strip on said supporting bracket frame and holding said reinforcing rail in said strip back, said expansions being longitudinally spaced from one another by a distance which is greater than a width of one of said holding claws in a longitudinal direction of said wiper strip, so that in a finally mounted condition said holding claws of said wiper strip engage between said expansions.

2. A windshield wiper blade as defined in claim 1, wherein each longitudinal side of said reinforcing rail is provided with a pair of said expansions.

3. A windshield wiper blade as defined in claim 2, wherein said reinforcing rail has a longitudinal axis, said expansions of one pair of said expansions being located opposite to said expansions of another pair of said expansions with respect to the longitudinal axis of said reinforcing rail.

4. A windshield wiper blade as defined in claim 1, wherein said reinforcing rail has an end portion, said expansions being arranged on said end portion of said reinforcing rail.

5. A windshield wiper blade as defined in claim 1, wherein said expansions are formed as deformed portions of said reinforcing rail.

* * * * *